United States Patent [19]
Lachnit

[11] 3,964,889
[45] June 22, 1976

[54] CONTINUOUS FILTER SILO FOR THE CLEANING OF FLUE GASES

[75] Inventor: Friedrich Lachnit, Mulheim (Ruhr), Germany

[73] Assignee: Deutsche Babcock & Wilcox Aktiengesellschaft, Germany

[22] Filed: Oct. 7, 1974

[21] Appl. No.: 512,975

[30] Foreign Application Priority Data
Oct. 11, 1973 Germany............................ 2351003

[52] U.S. Cl.................................... 55/429; 55/98; 55/474; 55/479
[51] Int. Cl.².......................................... B01D 46/30
[58] Field of Search............. 55/98, 99, 73, 77, 290, 55/390, 429, 474, 479, 282; 23/288 C, 288 E, 288 G, 283; 198/126, 140

[56] References Cited
FOREIGN PATENTS OR APPLICATIONS
593,156  10/1947  United Kingdom................... 55/474
601,386   5/1948  United Kingdom................... 55/474

*Primary Examiner*—Bernard Nozick
*Attorney, Agent, or Firm*—Law Firm of Roland T. Bryan

[57] ABSTRACT

This invention relates to apparatus for charging and emptying filter material in a continuous filter silo for the purification or cleaning of flue gases, and in one embodiment comprises a layer of filter material is located between two substantially vertically arranged wall sections which have apertures, and wherein the layer of filter material, defined by the wall sections which are of annular cross section, is subdivided by at least 4 vertically arranged intermediate walls into segments, and wherein means are provided for the controlled feed of flue gases such that selectively two of the segments at a time are excepted from the action of flue gas, thereby permitting the renewal of the filter material, while the remaining segments being under full action of flue gas.

15 Claims, 4 Drawing Figures

CONTINUOUS FILTER SILO FOR THE CLEANING OF FLUE GASES

BACKGROUND OF THE INVENTION

So-called continuous filter silos are used for the desulfurization of flue gases by means of absorption of the sulfur dioxide into activated coke granulate. During the exposure of flue gas, the filter material layer is retained in place. Such exposure of selected segments to flue gas is temporarily interrupted in order to effect removal, as well as replenishing, of the filter material in those segments. In known per se devices, the filter material may be fed through a feed line coming in over the roof of the silo. However, a continuous filter silo meant for a 700 megawatt power station must process approximately 4,000 tons of coke within 1 or 2 days. Typically, a continuous filter silo of such a magnitude will be over 30 meters high. Such height can render the filling and emptying of the individual segments of the filter material layer difficult, if not impossible.

Accordingly, it is an object of the present invention to provide a charging and emptying system of simple design for a continuous filter silo with intermittent operation capability that is capable of a large throughput of filter material.

SUMMARY OF THE INVENTION

Desired objectives may be achieved through practice of the present invention which, in one embodiment, comprises a charging and emptying system rotatably mounted around the vertical longitudinal axis of a continuous filter silo which accommodates a bucket charging mechanism, said system being housed in a relatively restricted space that is substantially airtight.

DESCRIPTION OF DRAWINGS

This invention may be more clearly understood from the description which follows and from the attached drawings in which.

DESCRIPTION OF PREFERRED EMBODIMENTS

Figure 1:
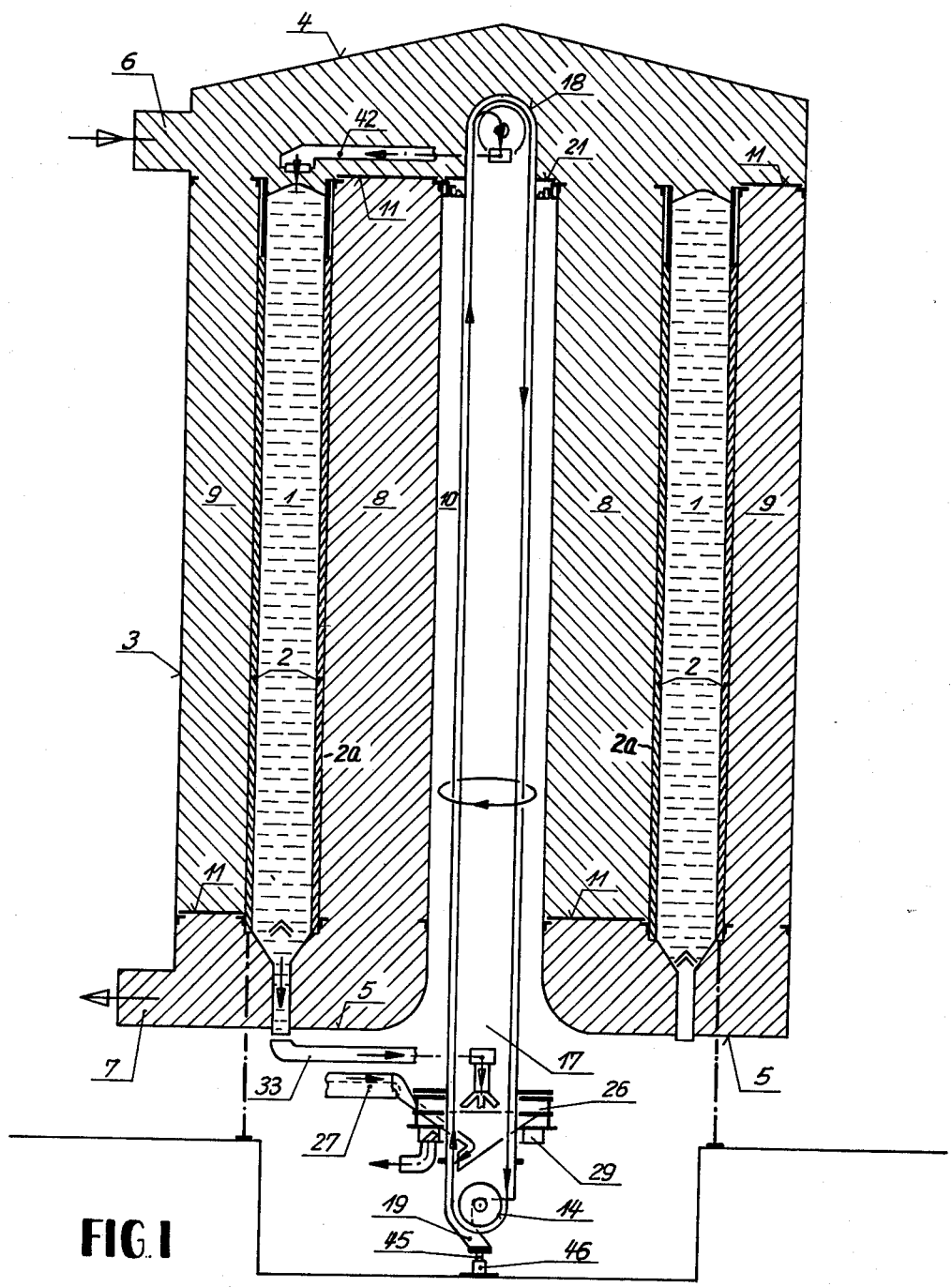
FIG. 1 shows a schematic vertical section through a continuous filter silo according to the invention.
Figure 4:
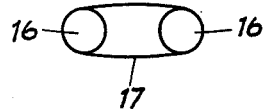
FIG. 4 shows the section IV—IV according to FIG. 2.
Figure 2:
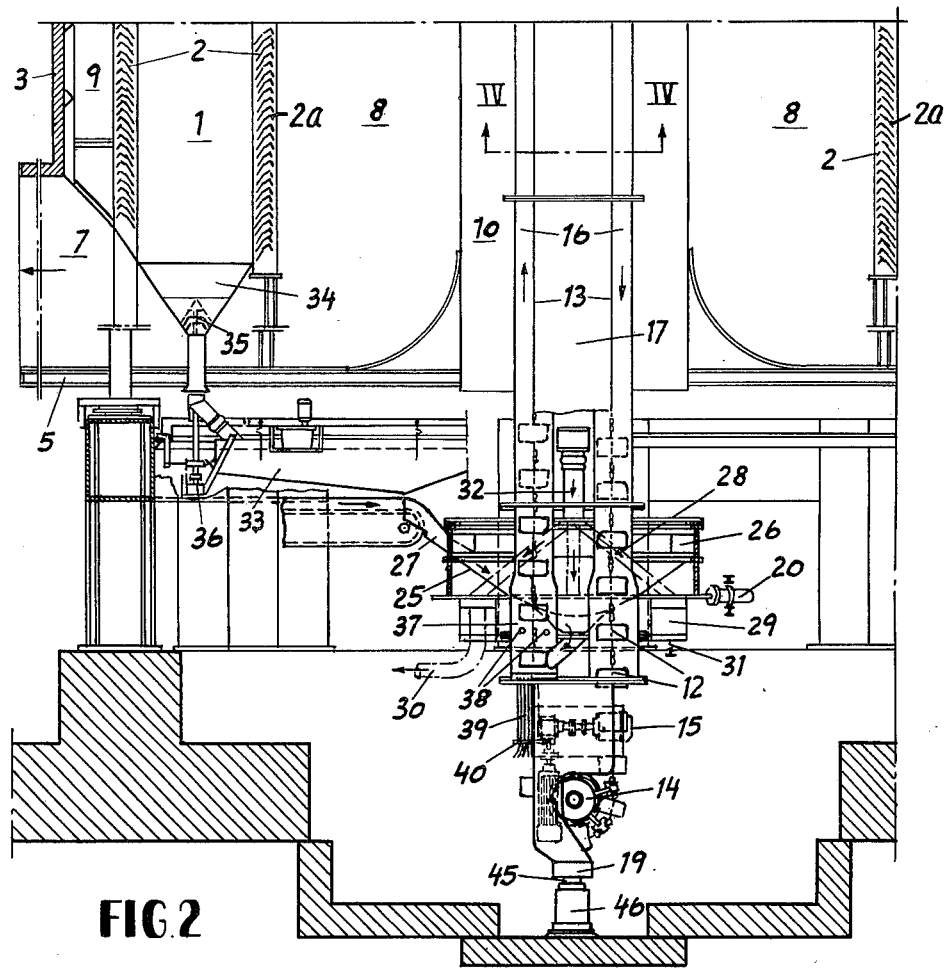
FIG. 2 shows the lower portion of the apparatus shown in FIG. 1.
Figure 3:
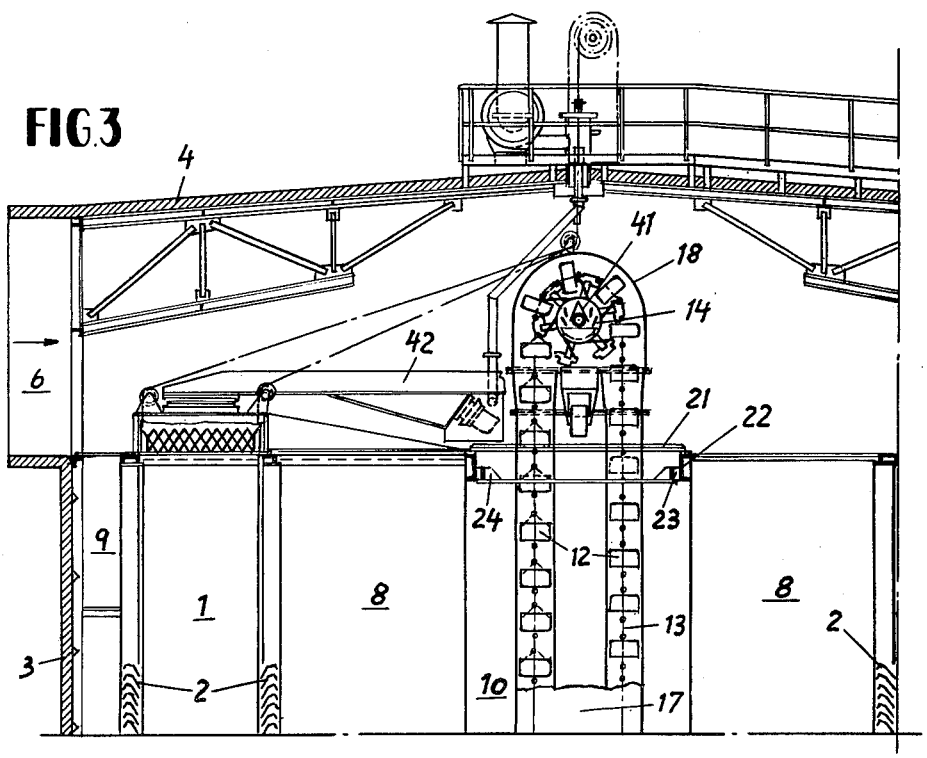
FIG. 3 shows the upper portion of the apparatus shown in FIG. 1.

A continuous filter silo, as shown in the attached drawings, serves for the desulfurization of flue gases by means of absorption of the sulfur dioxide into activated coke granulate. The activated coke granulate may be filled into the filter silo as filter material layer 1 in the space between two cylindrical wall sections 2. The wall sections 2 have apertures and, in the embodiment, herein illustrated and discussed, are created by louvre-like wall members 2a. The silo proper is formed by the exterior wall 3, the top or roof 4, and the bottom 5. The outer wall 3 of the silo, above the filter material layer 1, has a flue intake section 6, and below the filter material layer, it has an exhaust section for the purified gas 7. Laterally from the walls 2 of the filter layer 1, gas ducts 8 and 9 have been provided for, designed to lead the gas to be purified towards the filter material layer 1, or leading the purified gas away from the filter material layer subsequent to completed purification. In the center of the silo a central inner space 10 is left free through which the charging and emptying system, described in detail below, is positioned.

The filter layer 1 as well as the gas ducts 8 and 9 have been subdivided into a number of segments by means of wall sections (not shown) in radial-vertical direction. The charging of material into the segments will be stopped for such time as the segment in question is exposed to flue gas. Usually, flue gas is periodically stopped from flowing into two adjacent filter material segments of the filter silo at a time for the purpose of changing the filter charge. For this purpose, the corresponding segments of the gas ducts 8 and 9, at their upper and lower ends, are closed in groups by means of plates 11 which are rotatably mounted around the vertical longitudinal axis of the silo. Upon completion of the recharging and emptying process or cycle, the plates 11 will be advanced by one segment, and the cycle may then be repeated. The process of charging and emptying of a filter segment, with the described intermittent exposure of the filter segments, is apparent from the filter segment shown in FIG. 1 on the left-hand side.

The charging and emptying system or device consists of a cup or bucket conveyor arranged in the central inner space 10 of the silo. The cups or buckets 12 have a circular cross section and are connected freely rotatable by means of a single chain 13 along their cylindrical axis inside a concentric tubular nave fixed at the bottom of the bucket. The bucket chain runs in two pulleys 14, the lower of which is driven by means of the motor 15. The arms or spokes 100 of the pulleys 14 grab the chain 13 between the individual cups or buckets 12.

The rising, as well as the descending, sections of the bucket conveyor are both led through a tubular duct 16 surrounding and separated from the individual buckets by a small air gap. The two tubular ducts 16 are connected to each other by means of a housing consisting of the sheet jacket 17 and the hood or bonnet 18, whereby the latter encloses the pulley or wheel 14. The housing 17, 18 of the bucket conveyor continues downward and ends in a stand 19 in which the lower pulley or wheel also has been mounted. The entire housing, from the bonnet 18 down to the stand 19, can be rotated around the vertical longitudinal axis of the silo by means of a rotary drive mechanism 20. Rotation is effected in the same sequence in which the individual segments of the filter material layer 1 are exempted from flue gas exposure by means of relocation or shifting of the plates 11, for the purpose of replacing the filter material.

The silo entrance is sealed by means of a slip ring gasket. The latter consists of a plate 21 which is connected with the housing 17 of the bucket conveyor and slides along a rigidly mounted counterpiece 22 at the silo jacket. For purposes of accurate centering, a roller rim consisting of hollow rollers has been provided which is situated between the counterpiece 22 and a ring 24 of the housing 17.

With its stand 19, the bucket conveyor rests on a rotatable piston 45 of a rigidly mounted, stationary hydraulic cylinder 46. The hydraulic cylinder 46 is load-compensated and absorbs the weight of the bucket conveyor to such a degree as to bias the slip ring seal plate 21 with a constant sealing power. At the same time, the temperature-induced longitudinal length changes of the bucket conveyor and the silo structure are compensated for by the position of the piston 45.

The lower part of the housing has been designed as a filter material distribution device which consists of a cone 25, the orifice of which terminates above a filler sector 37, hereinafter described in greater detail. The cone 25 is hermetically connected to a rigidly mounted annular frame 26, having a connection 27 for the incoming regenerated filter material.

Four chutes 28 are led through the cone, all of them terminating in a narrow, rigid annular channel 29 which is formed by another annular frame and is under biasing pressure provided by springs 31. Through an exhaust pipe 30 arranged at the annular channel 29, the filter material is removed by suction and transported into a desorber. That the chutes 28 are four in number ensures that the suction pipe sections in the annular channel 29 are kept short. The chute pipes all originate from a central pipe 32. The charged filter material 1 from the corresponding segment is transported towards the central pipe 32 over a vibration conveyor which is amplitude-modulated so as to monitor the size of the charge increments. The discharge channel is firmly mounted to the rotatable housing and is moved underneath the orifice 34 of the filter material layer which has a closure. The closure 35 of the discharge orifice 34 is pressed upward from below by means of a rod 36 whenever the discharge channel 33 has been moved in position. The arrows show the direction of motion of the regenerated, as well as the charged, filter material.

The charging section 37 for the buckets 12, in the described charging system, is in vertical position. It has been provided for in the lower part of the tubular duct 16. During upward movement, the individual buckets pass through the charging system and are filled in the process. Above the charging section 37 there is a rim of nozzles 38 obliquely directed against the filling surface in the buckets 12. The jets of air emanating from the jets 38 blow away the excess filter material heaped above the rim of the bucket. The nozzle axes are in almost horizontal position and arranged as a group of secants relative to the bucket circle, whereby their direction of blowing has been adjusted in a dextrorotatory or sinistrorotatory direction as a group.

The length of the charging section 37 corresponds at least to the distance between a pair of buckets. The region beneath the charging section is sealed by means of a jacket of sectional radially extended rectangular rods 39. The sectional rods 39 hug the outer bucket wall tightly and resiliently and thus provide efficient sealing. The tight fit of the sectional rods 39 is effected by two loops of ropes provided with springs. Furthermore, the sectional rods 39, on their exterior, have radial slots, each of which is engaged above and below by a retaining ring for the purpose of axial stability.

The charged buckets which are moved upwards through the tubular duct 16 are discharged above the upper pulley 14. As a protection against filter material dropping down, the pulley 14, as well as its shaft, is covered on both sides by roof-shaped baffles 41, designed to direct the filter material towards both sides of the shaft, and into a driven conveyor channel 42. The conveyor channel 42 is connected with the hood or bonnet 18 and is synchronously driven together with the elevator axle across each individual segment of the filter material layer 1.

From the foregoing description, it will be clear that through practice of this invention it is possible to provide in the central interior of the silo, a charging and emptying system rotatably mounted around the vertical longitudinal axis of the silo, whereby such system has a rotatory drive operating in the sequence of the renewal or replacement of the filter material in the segments. Such a device can be housed in a relatively restricted space and still feature a very high throughput. It is well suited for the continuous charging and emptying of the individual filter material segments of the silo. The device according to the invention can also be used in the same manner, without changing the basic equipment, even if the silo later on is expanded, by arranging a second filter material layer or stratum which surrounds the aforementioned layer of filter material.

The charging or filling unit will expediently contain lock-type airtight feeding compartments or elements consisting of buckets having a circular cross section and being connected along their cylindrical axes by means of one single chain, and whereby their exterior wall slides in a tubular duct with a small air gap, i.e. in a relatively airtight manner. Thereby the rotatable tubular ducts are connected with a housing, and the latter is connected with the silo entrance via a slip ring seal. The sealing effect achieved in the above manner is sufficient for the effective separation of the silo's atmosphere from the atmosphere outside. This tends to keep the expenditure for the construction of the silo low, because the use of an expensive bucket wheel lock can be dispensed with and the flue gas feed mechanism into the silo head can be kept much simpler.

According to an additional characteristic of the invention, the arrangement of a vertically oriented bucket charging mechanism permits simplification of the structure as well as the handling of large amounts of filter material, since the length of such charging mechanism or section only needs to be not less than the distance between two buckets. In this arrangement, the underside of the charging mechanism or section is sealed off by means of a jacket of sectional rods closely and resiliently hugging the outer bucket wall. The abovementioned jacket, moreover, possesses a degree of total mobility in a radial direction which permits the equalization and damping of vibrations of the chain axis resulting from the polygonally designed arms of the lower reversing wheel. In the arrangement of the vertical charging or filling system or section traversed by the buckets, it is advantageous to provide, above and inside the tubular duct, a rim of nozzles having jets directed against the heaped material in the buckets. The air jets emanating from the nozzles blows away the material heaped above the upper rim of the buckets so that they will just be filled to the brim. This prevents the material from falling out of the buckets during conveying and getting caught in the narrow air gap between the outer bucket walls and the tubular duct.

A filter material distributor can be employed to advantage in this arrangement. According to another advantageous characteristic of the invention, it is suggested to provide, for the lower part of the housing connecting to two tubular ducts, a filter material distribution device for two streams of material crossing each other's paths, consisting of a cone which is sealed and is connected to a rigidly mounted annular frame that is provided with a connecting piece for one stream, plus a second part consisting of four chutes being led through the cone and terminating in a rigidly mounted, spring-biased annular channel equipped with an exhaust pipe or tube. This helps to simplify the replacement of filter material by using the identical device for the charging as well as for the emptying, whereby such device is capable of being connected to the corresponding segments. Such device can be introduced into the filter cycle consisting of absorption and desorption.

It is to be understood that the embodiments herein described and shown are by way of illustration and not of limitation, and thus other embodiment may be made by those skilled in the acts without departing from the spirit or scope of this invention.

I claim:

1. In a continuous filter silo for the purification of flue gases by means of a filter layer located between two substantially vertically arranged wall sections of circular cross-section that are provided with apertures, wherein the filter material layer containers defined by said wall sections are subdivided into segments by means of at least four vertically arranged intermediate wall sections, and wherein means are provided for the controlled intake of flue gas in such a way that selected of said segments have have their exposure to flue gas stopped for the purpose of regeneration of the filter material the improvement comprising, a charging and emptying system positioned in the central inner space of the silo, which system is rotatably mounted around the vertical longitudinal axis of the silo and comprises a bucket-type elevator means adapted for transporting filter material from the region of the bottom of said silo to the region of the top of said silo and for discharging the contents of the bucket of said elevator onto means for transporting said material into selected of said segments of said filter material container, and drive means for causing said transporting means to move to selected of said segments.

2. Apparatus according to claim 1, in which the charging system has charging buckets sealed in the manner of a lock multi cell sluice.

3. Apparatus according to claim 1, in which the elements of the charging system include buckets of circular cross section connected to each other along their cylindrical axes by means of a chain, which is positioned inside a tubular chamber, the bottom of the buckets being fixed at their bottom to said chain, and wherein the outer wall of said buckets is guided in a tubular duct and is separated therefrom by a small air gap.

4. Apparatus according to claim 3, in which the rotatable tubular ducts are connected to a housing which is connected to the silo entrance via a slip ring seal.

5. Apparatus according to claim 4, comprising a slip ring seal biased with a constant sealing pressure resulting from a part of weight of the charging and emptying system, and a load-compensated hydraulic cylinder for automatic compensation for temperature induced elongation and the absorption of the load.

6. Apparatus according to claim 5, in which, in the lower vertical section of the charging system, a charging section has been provided for the buckets, and wherein the length of such section is at least as great as the space between adjacent buckets.

7. Apparatus according to claim 6, in which the underside of the charging section is sealed by means of a jacket of sectional rods, such jacket being impervious to the granular material being conveyed, and wherein said sectional rods hug the buckets tightly and resiliently.

8. Apparatus according to claim 7, in which the sectional rods are biased or pressed against the outer wall of the buckets via at least one rope loop.

9. Apparatus according to claim 8, in which on the outer part of the sectional rods, radial slots have been provided which are engaged by one or two retaining rings for the purpose of axial stability.

10. Apparatus according to claim 9, in which the jacket consisting of the sectional rods permits a total radial mobility.

11. Apparatus according to claim 10, in which a short distance above the charging section, a rim of nozzles has been arranged in the widened lower part of the tubular duct, whereby the axes of the individual nozzles have been set in the pattern of a group of secants in relation to the bucket rim, and adjusted with a common rotatory direction of blow.

12. Apparatus according to claim 11, in which the contents of each bucket are emptied towards both sides of the upper pulley, and wherein the shaft of said pulley, on both sides, is protected by a roof-shaped baffle over which the buckets are emptied into a conveyor channel.

13. Apparatus according to claim 12, in which the lower part of a housing connecting tubular ducts has been provided with a filter material distributor for two streams of materials with their paths crossing, wherein such distributor, for one stream, consists of a cone connected and sealed to a rigidly mounted annular frame with a connecting piece, and a second part, consisting of four chute pipes leading through the cone, and wherein said pipes terminate in a firmly mounted, resiliently biased annular channel provided with an exhaust pipe.

14. Apparatus according to claim 13, in which the rotary drive for the rotation of the housing acts on the filter material distributor on the outside of the silo.

15. Apparatus according to claim 14, comprising conveyor chute rotatable synchronously with the elevator for the removal of filter material from segments.

* * * * *